(12) United States Patent
Vladescu et al.

(10) Patent No.: US 8,301,804 B2
(45) Date of Patent: Oct. 30, 2012

(54) PROVIDING RING PROTECTION FOR ACCESS NETWORKS

(75) Inventors: Virgil M. Vladescu, Hillsdale, NJ (US); Stephen J. Brolin, Livingston, NJ (US)

(73) Assignee: Fujitsu Limited, Kawasaki (JP)

( * ) Notice: Subject to any disclaimer, the term of this patent is extended or adjusted under 35 U.S.C. 154(b) by 439 days.

(21) Appl. No.: 12/480,875

(22) Filed: Jun. 9, 2009

(65) Prior Publication Data

US 2010/0312878 A1 Dec. 9, 2010

(51) Int. Cl.
G06F 15/16 (2006.01)

(52) U.S. Cl. ........................................ 709/249

(58) Field of Classification Search .................... 709/249
See application file for complete search history.

(56) References Cited

U.S. PATENT DOCUMENTS

| | | | | |
|---|---|---|---|---|
| 5,675,735 | A * | 10/1997 | Gallagher et al. | 709/228 |
| 6,359,858 | B1 * | 3/2002 | Smith et al. | 370/217 |
| 6,757,268 | B1 * | 6/2004 | Zendle | 370/338 |
| 7,006,434 | B1 * | 2/2006 | Klein et al. | 370/223 |
| 7,093,027 | B1 * | 8/2006 | Shabtay et al. | 709/239 |
| 7,570,637 | B2 * | 8/2009 | Serbest et al. | 370/389 |
| 7,983,150 | B2 * | 7/2011 | Bruckman et al. | 370/218 |
| 2002/0181037 | A1 * | 12/2002 | Lauder et al. | 359/110 |
| 2005/0047328 | A1 * | 3/2005 | Dembeck et al. | 370/222 |
| 2005/0058064 | A1 * | 3/2005 | Phelps et al. | 370/225 |
| 2005/0158047 | A1 * | 7/2005 | Way et al. | 398/59 |
| 2007/0253326 | A1 * | 11/2007 | Saha et al. | 370/217 |
| 2008/0181226 | A1 * | 7/2008 | Varier et al. | 370/390 |
| 2008/0304407 | A1 * | 12/2008 | Umansky et al. | 370/222 |
| 2010/0039943 | A1 * | 2/2010 | Ryoo et al. | 370/242 |
| 2010/0281106 | A1 * | 11/2010 | Ashwood-Smith | 709/203 |
| 2010/0287405 | A1 * | 11/2010 | Soon | 714/4 |

OTHER PUBLICATIONS

ITU-T Recommendation G.8031/Y.1342, Telecommunication Standardization Sector of ITU, Series G: Transmission Systems and Media, Digital Systems and Networks, Ethernet over Transport aspects—General aspects; Series Y: Global Information, Infrastructure, Internet Protocol Aspects and Next-Generation Networks, Internet protocol aspects—Transport, Ethernet Protection Switching, International Telecommunication Union, 50 pages, Jun. 2006.

* cited by examiner

*Primary Examiner* — Imad Hussain
(74) *Attorney, Agent, or Firm* — Baker Botts L.L.P.

(57) ABSTRACT

According to one embodiment, an apparatus comprises one or more hub interfaces and one or more processors. A hub interface is coupled to an access network element of a ring network comprising a number of access network elements. The ring network comprises a pair of rings: a first ring traveling in a first direction and a second ring traveling in a second direction. The processors perform the following for each access network element: facilitate establishing a pair of point-to-point logical connections to couple a access network element to a hub interface at a corresponding dedicated bandwidth, a first connection traveling along the first ring, a second connection traveling along the second ring; facilitate establishing a pair of tunnels on the pair of point-to-point connections; and utilize the tunnels to protect the ring network.

20 Claims, 16 Drawing Sheets

PROVIDING RING PROTECTION FOR ACCESS NETWORKS

TECHNICAL FIELD

This invention relates generally to the field of communication systems and more specifically to providing ring protection for access networks.

BACKGROUND

A network may include working and protection paths to protect the network. The working path may be used to communicate traffic. If the working path fails, the protection path may then be used to communicate the traffic.

SUMMARY OF THE DISCLOSURE

In accordance with the present invention, disadvantages and problems associated with previous techniques for protecting networks may be reduced or eliminated.

According to one embodiment, an apparatus comprises one or more hub interfaces and one or more processors. A hub interface is coupled to an access network element of a ring network comprising a number of access network elements. The ring network comprises a pair of rings: a first ring traveling in a first direction and a second ring traveling in a second direction. The processors perform the following for each access network element: facilitate establishing a pair of point-to-point logical connections to couple a access network element to a hub interface at a corresponding dedicated bandwidth, a first connection traveling along the first ring, a second connection traveling along the second ring; facilitate establishing a pair of tunnels on the pair of point-to-point connections; and utilize the tunnels to protect the ring network.

According to one embodiment, an apparatus comprises one or more interfaces and one or more processors. The interfaces are coupled to a hub network element and one or more access network elements of a ring network. The ring network comprises a pair of rings: a first ring traveling in a first direction and a second ring traveling in a second direction. The processors perform the following: facilitate establishing a pair of point-to-point logical connections to the hub network element at a corresponding dedicated bandwidth, a first connection traveling along the first ring, a second connection traveling along the second ring; facilitate establishing a pair of tunnels on the pair of point-to-point connections, the tunnels comprising a first tunnel and a second tunnel; and utilize the tunnels to protect the ring network.

Certain embodiments of the invention may provide one or more technical advantages. A technical advantage of one embodiment may be that an access network with a physical ring network topology may have logical mesh connections. The connections may have logical mesh tunnels. The tunnels may be used to provide protection for the access network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
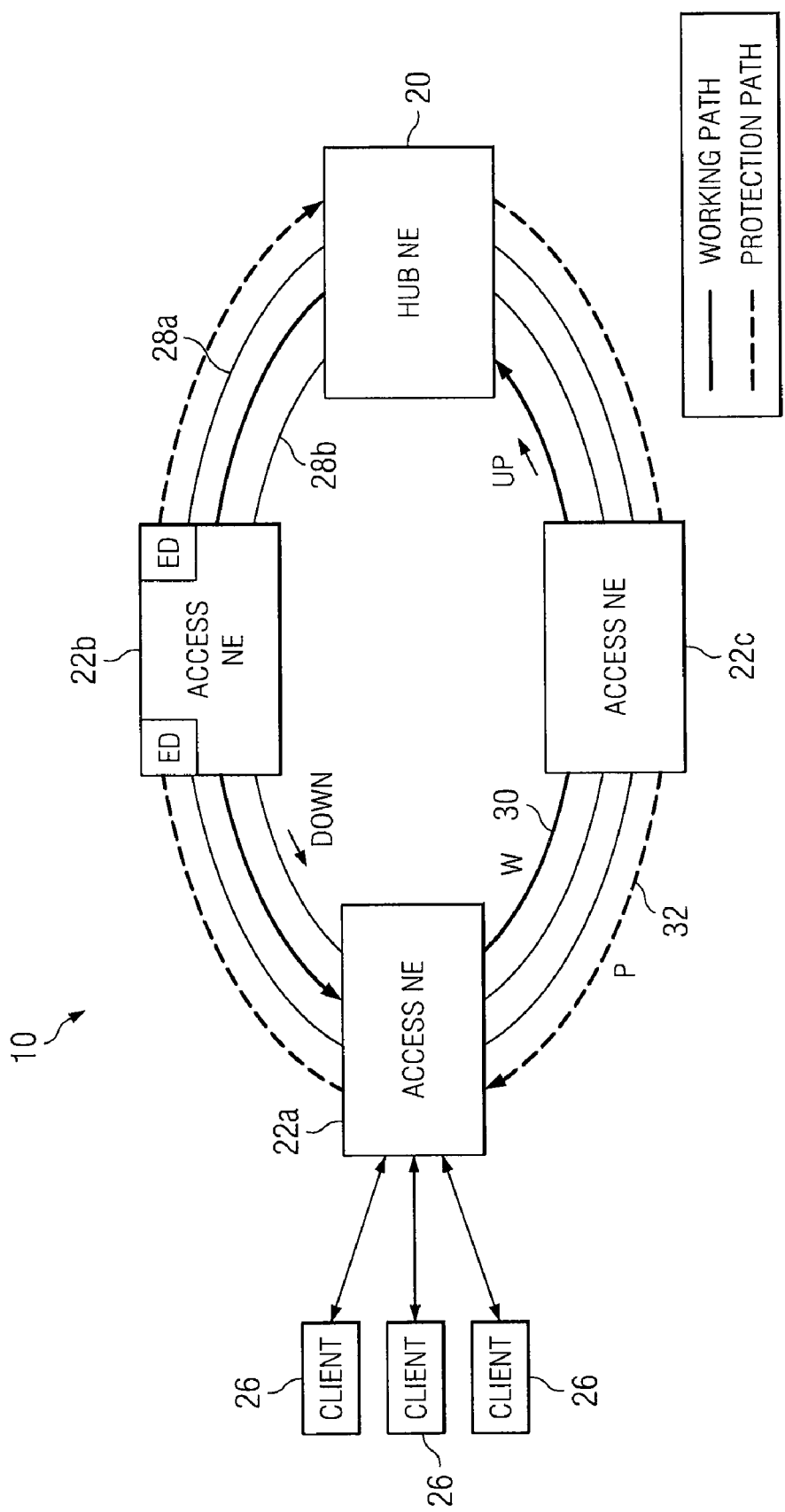
FIG. 1 illustrates the physical topology of a working path and a protection path.
Figure 2:
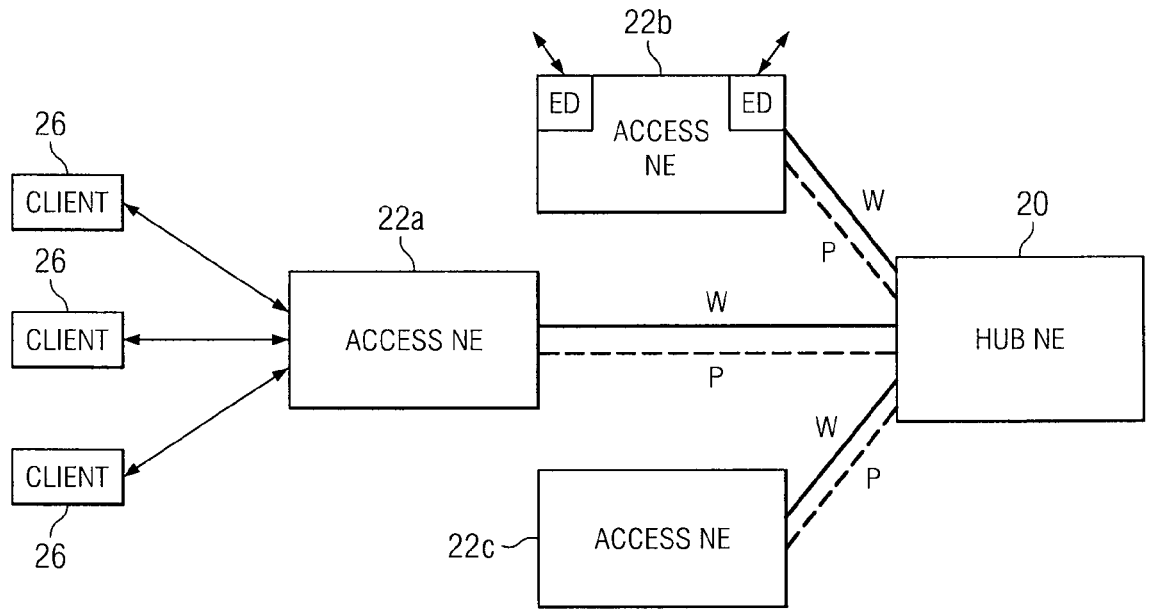
FIG. 2 illustrates the logical architecture of working paths and protection paths.

FIGS. 1 and 2 illustrate an embodiment of a ring network 10 for which ring protection may be provided. Ring network 10 may be an access network that includes a hub network element 20, one or more access network elements 22 (22a, b, c), one or more clients 26 (26a, b, c), and rings 28 (28a, b).

In particular embodiments, ring network 10 may provide a packet level equivalent of Unidirectional Path Switched Ring (UPSR) Synchronous Optical NETwork (SONET) ring protection for access networks. In particular embodiments, ring network 10 has a physical ring network topology with a logical mesh architecture.

The logical mesh architecture includes point-to-point connections and tunnels between access network elements 22 and hub (or headend) network element 20. The point-to-point connections for a particular access network element 22 are established at a bandwidth dedicated to the access network element 22. The dedicated bandwidth may be the same for upstream and downstream flows. An access network element 22 may use its dedicated bandwidth without being required to coordinate with other access network elements 22. Each access network element 22 may provide its own node level traffic management.

The tunnels may be any suitable tunnels, such as Virtual Local Area Network (VLAN) or Provider Backbone Bridge Traffic Engineering (PBB-TE) tunnels. Tunnels may transport traffic (such as customer traffic with source traffic) on rings in a clockwise and/or counter-clockwise direction.

Hub (or headend) network element 20 manages routing, control, access, and/or other communications operations for ring network 10. In particular embodiments, hub network element 20 may allow SONET-based traffic and/or packet-based traffic to be switched, groomed, and managed in its native format. Hub network element 20 may support pseudowire and/or MPLS technologies to deliver connection-oriented Ethernet. In particular embodiments, hub network element 20 shapes downstream traffic for each tunnel. In some examples, hub network element 20 may be a router such as a FUJITSU FLASHWAVE Packet Optical Networking Platform.

Access (or ring) network element 22 manages the flow of traffic at the edge between clients 26 and hub network element 20. In particular embodiments, access network element 22 may provide high capacity Ethernet transport and/or aggregation services with support for existing SONET/TDM services at the network edge. In particular embodiments, access network elements 22 shape upstream traffic. In some examples, access network element 22 may be an gateway such as a FUJITSU FLASHWAVE Compact Delivery System (CDS).

Client 26 may be any suitable computing system that communicated with ring network 10 through access network element 22. Examples of client 26 include an endpoint (such as an Ethernet device), a server, a firewall router, and a CDS.

Rings 28 may communicate signals through ring network 10. In particular embodiments, rings 28 may be optical fibers that communicate optical signals. A connection may be regarded as traveling along a ring if the connection travels along the path of the ring, travels along a segment of the ring, travels in the direction of the ring, and/or travel in any other manner associated with the ring.

In particular embodiments, a working path 30 and a protection path 32 may be established on a tunnel pair. FIG. 1 shows the physical topology of working path 30 and protection path 32 for access network element 22a. Network elements 22a and 22b may also have working paths 30 and protection paths 32 (not shown). FIG. 2 shows the logical architecture of working paths 30 and protection paths 32 for access network elements 22a, 22b, and 22c.

Network 10 may protect upstream and/or downstream flows. Service Operation, Administration, and Maintenance (s-OAM) or other suitable flows may be used to monitor the connections. If a failure is detected on a working path, then traffic may be moved to the protection path. Automatic Protection Switching (APS) messages may be exchanged between the network elements to coordinate the protection switching.

Network 10 may be protected using any suitable techniques, for example VLAN or PBB-TE based techniques. In particular embodiments of the VLAN based technique, G.8031—Ethernet Linear Protection Switching of the International Telecommunication Union (ITU) may be extended for VLAN based protection coordination between endpoints. Each access network element 22 deals with add/drop traffic and pass-through traffic, and provides for add/drop VLAN cross-connects and pass-through VLAN cross-connects with the associated Connection Admittance Control (CAC) considerations. Connection Admittance Control limits the total allocated traffic from a network element to the ring. Per flow or per client policing may limit the ingress traffic per flow or per client. The limitations may be based on a service level agreement (SLA).

In particular embodiments of the PBB-TE based technique, a similar technique may be used, except PBB-TE tunnels are present in place of VLAN based connections.

Figure 3:
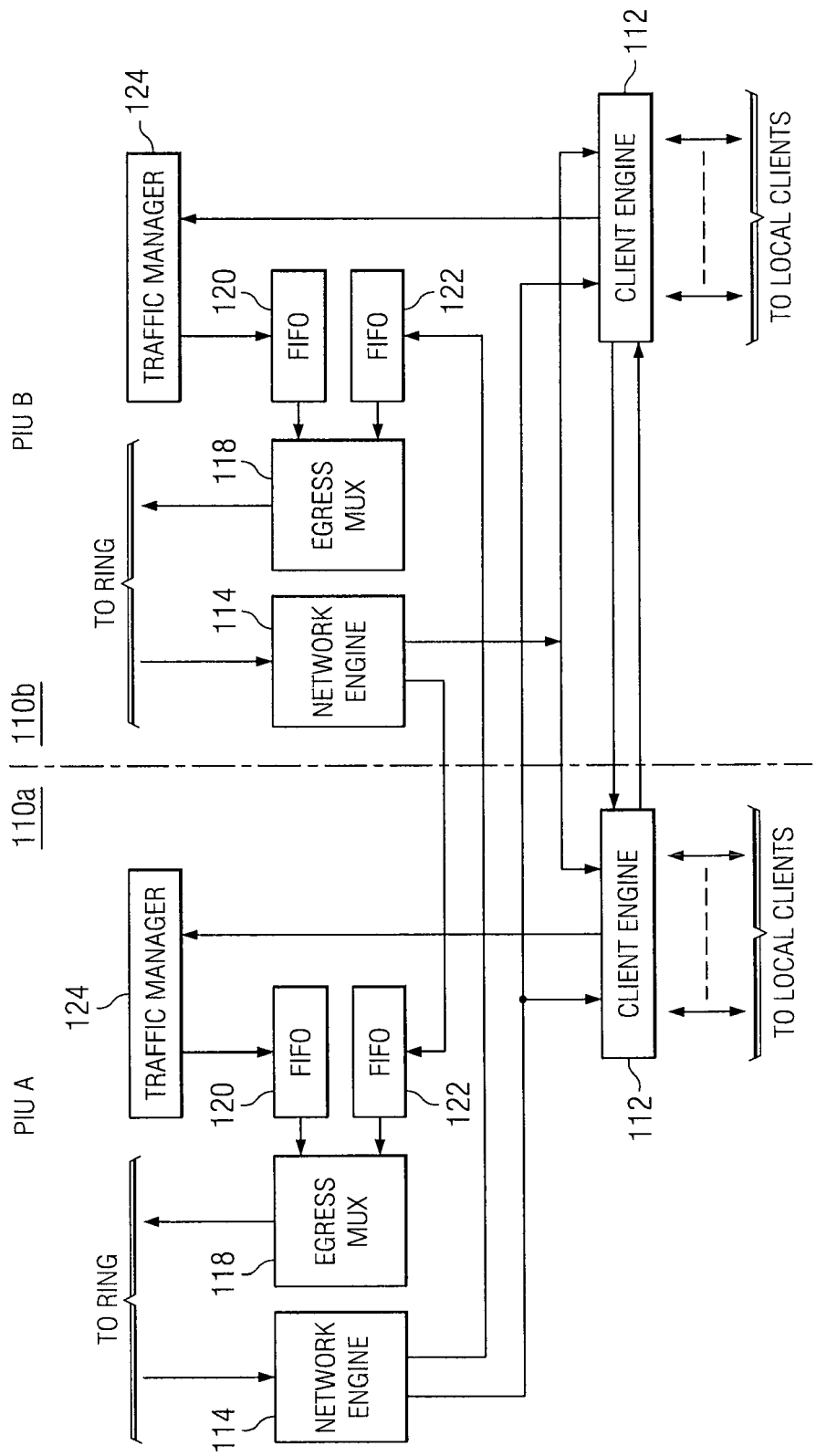
FIG. 3 illustrates an example of an access network element.

FIG. 3 illustrates an example of an access network element 22 that may be used in ring network 10 of FIG. 1. In the illustrated example, access network element 22 includes one or more plug in units (PIUs) 110 (such as 110a and 110b). Each plug in unit 110 includes a client engine 112, a network engine 114, an egress multiplexer (mux) 118, one or more first-in-first-out buffers (FIFOs) 120, 122, and a traffic manager 124.

Incoming traffic refers to the traffic that network element 22 receives, and outgoing traffic refers to the traffic that network element 22 sends. Added traffic refers to traffic that network element 22 adds to traffic of ring network 10, dropped traffic refers to traffic that network element 22 takes from ring traffic, and pass-through refers to ring traffic that passes through network element 22. In particular embodiments, add/drop traffic may be VLAN based Ethernet Virtual Circuits (EVCs) that are terminated/generated at this node, and pass-through traffic may be VLAN based EVCs that terminate in other nodes around the ring.

In particular embodiments, plug in units 110a and 110b of network element 22 form a protection pair. For example, if a plug in unit 110a fails, then the other plug in unit 110b may be used.

Client engine 112 manages communication between network element 22 and client 26. In particular embodiments, client engine 112 may classify ingress flows based on port, VLAN tag, and/or other feature. Client engine 112 may police ingress flows based on client's Service Level Agreement. Client engine 112 may drop non-conforming packets and color packets above guaranteed but below maximum flow rate. Client engine 112 may forward upstream flows to the appropriate ring port via traffic manager on same PIU or mate PIU, and/or may forward downstream flows to the appropriate client port.

Network engine 114 manages communication between network element 22 and ring 28. In particular embodiments, network engine 114 may classify ingress flows from ring based on VLAN tag and/or other feature. Network engine 114 may forward ring pass thru traffic across backplane to mate Plug In Unit (PIU) and/or may forward drop traffic to client engine (on same or mate PIU).

Traffic manager 124 manages traffic for access network element 22. In particular embodiments, traffic manager 124 shapes individual flows that form outgoing traffic. Traffic manager 124 may shape the flows based on bandwidth allocated to access network element 22. For example, the flows may be shaped such that total outgoing traffic to ring does not exceed the allocated bandwidth. The total traffic may include pass thru and outgoing traffic. In particular embodiments, traffic manager 124 manages traffic added to outgoing traffic in accordance with traffic dropped from incoming traffic in any suitable manner. For example, the added traffic should not exceed the dropped traffic. In particular embodiments, traffic manager 124 schedules flows, and may schedule flows based on priority. In particular embodiments, traffic manager 124 may drop packets based on packet coloring from client engine 112 and buffer congestion.

First-in-first-out buffers (FIFOs) 120, 122 buffer outgoing traffic. In particular embodiments, FIFO 122 buffers pass thru traffic from mate PIU, and FIFO 120 buffers locally generated outgoing traffic from traffic manager 124. FIFOs 120, 122 may handle short term bursts. FIFOs 120, 122 may pause against traffic manager 124 if either or both FIFOs 120, 122 start to reach capacity.

Egress multiplexer (mux) 118 multiplexes outgoing traffic. In particular embodiments, egress multiplexer 118 multiplexes locally generated outgoing traffic from FIFO 120 with pass thru ring traffic from FIFO 122. Ring pass thru traffic may have priority over locally generated traffic, or vice-versa.

Figure 4:
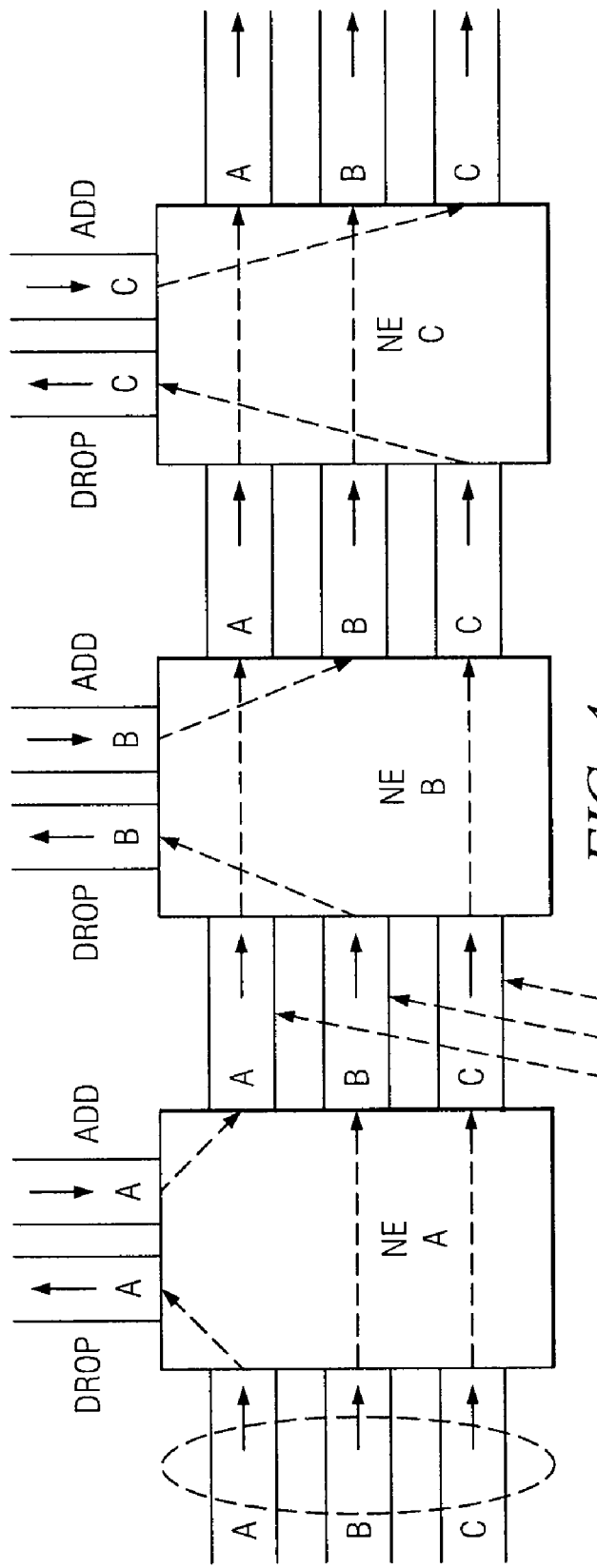
FIG. 4 illustrates an example of bandwidth allocation.

FIG. 4 illustrates an example of bandwidth allocation for network elements A, B, and C. In the illustrated embodiment, each network element is allocated a fixed portion $P(x)$, $x=A$, B, C, of the total ring bandwidth. Bandwidth may be allocated such that the sum of the allocations $P(A)+P(B)+P(C)$ does not exceed total ring bandwidth, and each network element cannot add more traffic than its allocated bandwidth.

Figure 5:
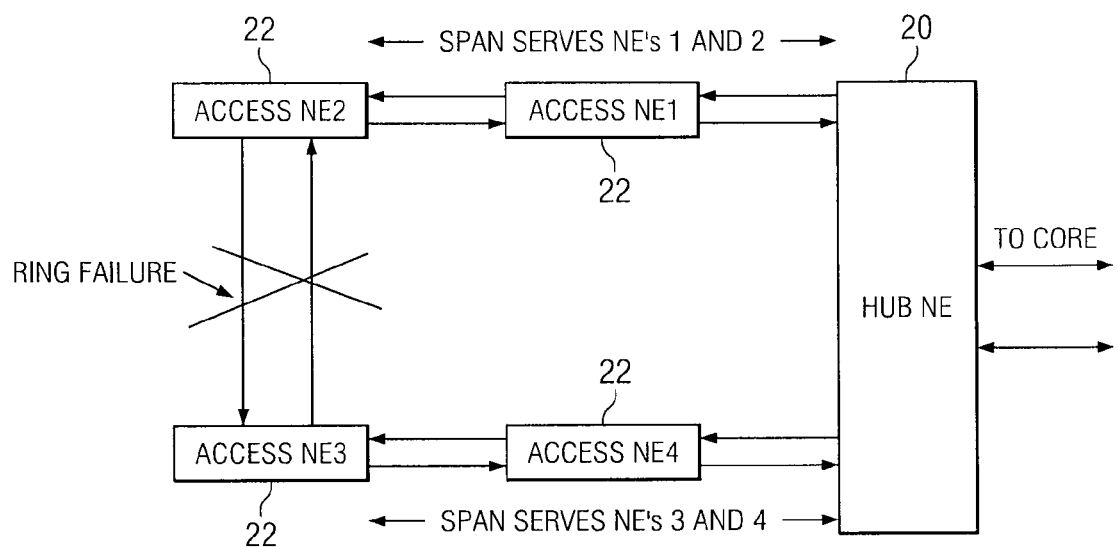
FIG. 5 illustrates an example of protection of a ring network.

FIG. 5 illustrates an example of protection of ring network 10. In particular embodiments, ring network 10 may protect against a failed ring, a failed PIU, or a failed client. If there is a single point failure on a working path ring, traffic may be switched to the protection path ring.

Client links that couple to plug in units 110 of network element 22 (FIG. 3) form a link aggregation pair. The link aggregation may be 1:1, where only link sends traffic. Or, the link aggregation may be 1+1, where both links send traffic. In either case, if a single client link of the pair fails, the working client link may be used.

Plug in units 110 of network element 22 (FIG. 3) form a protection pair. For example, if a plug in unit 110a fails, then the other plug in unit or 110b processes the client traffic and the ring traffic. Loss of a plug in unit 110 may cause part of ring network 10 to fail. Other access network elements 22 may perform ring protection to avoid a loss of service.

If a single client link of a pair fails and a ring fails, a client can be connected to a working ring port to avoid a loss of service. If a ring fails in more than one location, there may be some loss of service, which is typical with rings. If a plug in unit 110 fails, and a client link fails on the working plug in unit 110, service may be lost.

FIGS. 6A through 11D illustrate examples of ring protection with G.8031 that may be used by the systems disclosed herein. G.8031 has two modes of operation: 1+1 protection and 1:1 protection. In 1+1 protection, the transmitter sends flows along the working and protection paths. The receiver selects a flow from one path. In 1:1 protection, the transmitter sends flows only on the working path. The protection path is reserved, but carries no flows. The transmitter and receiver are on the same path. Multiple flows are protection switched individually.

FIGS. 6A, 6B, 9A, and 9B illustrate an example of ring network 10 for which protection may be provided. Ring network 10 includes hub network element 20 and access network elements 22A, B, and C. In the illustrated example, Xd represents downstream from hub network element to access network element X, and Xu represents upstream from access network element X to hub network element, where X=A, B, C. In the example, ring network 10 has a Gbps bandwidth, so Ad+Bd+Cd=10G maximum and Au+Bu+Cu=10G maximum. In the example, bandwidth allocation per network element is symmetrical: Ad=Au, Bd=Bu, Cd=Cu. In other examples, bandwidth allocation need not be symmetrical.

In certain embodiments, access network elements 22 are G.8031 capable and ring aware. Hub network element 20 is G.8031 capable, but need not be ring aware. Hub network element 20 may have two sets of two-way ports. Each 2-way port may send and receive traffic. G.8031 control packets (normally a small percentage of the total bandwidth) may flow on working and protection ports of hub network element 20.

Figure 6A:
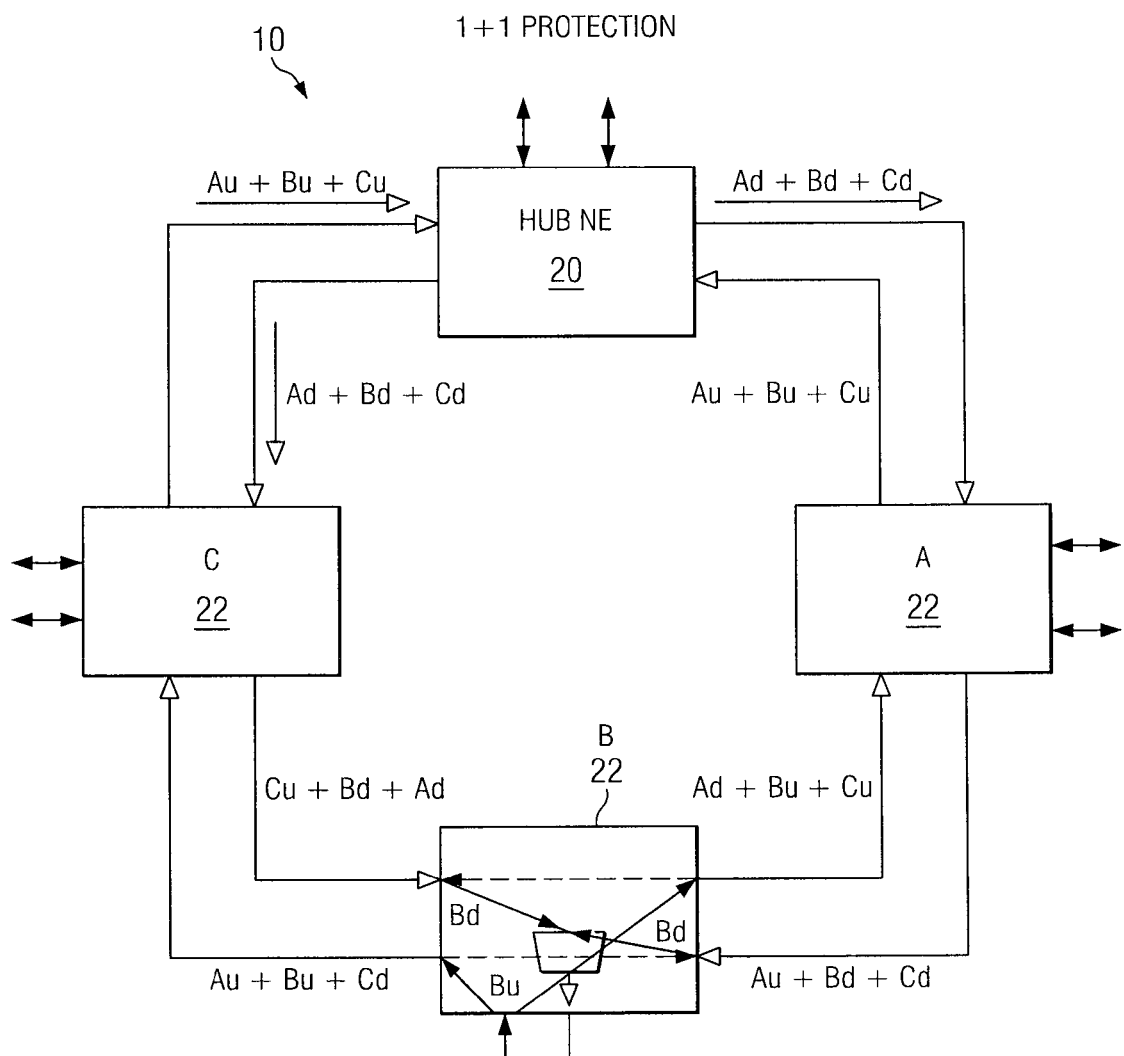
FIGS. 6A and 6B illustrate an example of 1+1 protection for a ring network.
Figure 6B:
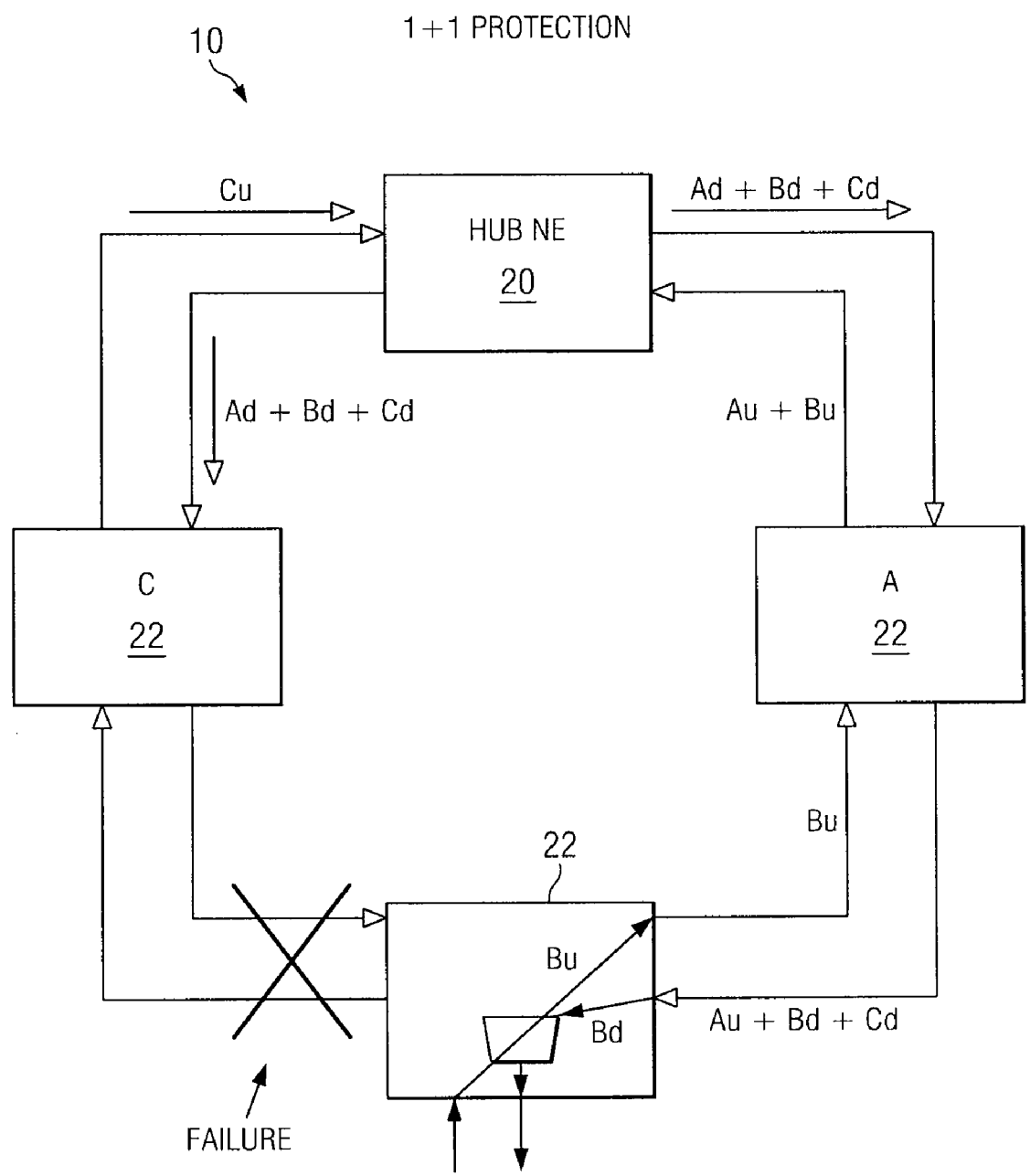

FIGS. 6A and 6B illustrate an example of 1+1 protection for ring network 10 with hub network element 20 and access network elements 22A, B, and C. Flows are replicated and received from/on both hub ports of hub network element 20. If a failure occurs, access network elements 22 can still send and receive flows.

Figure 7:
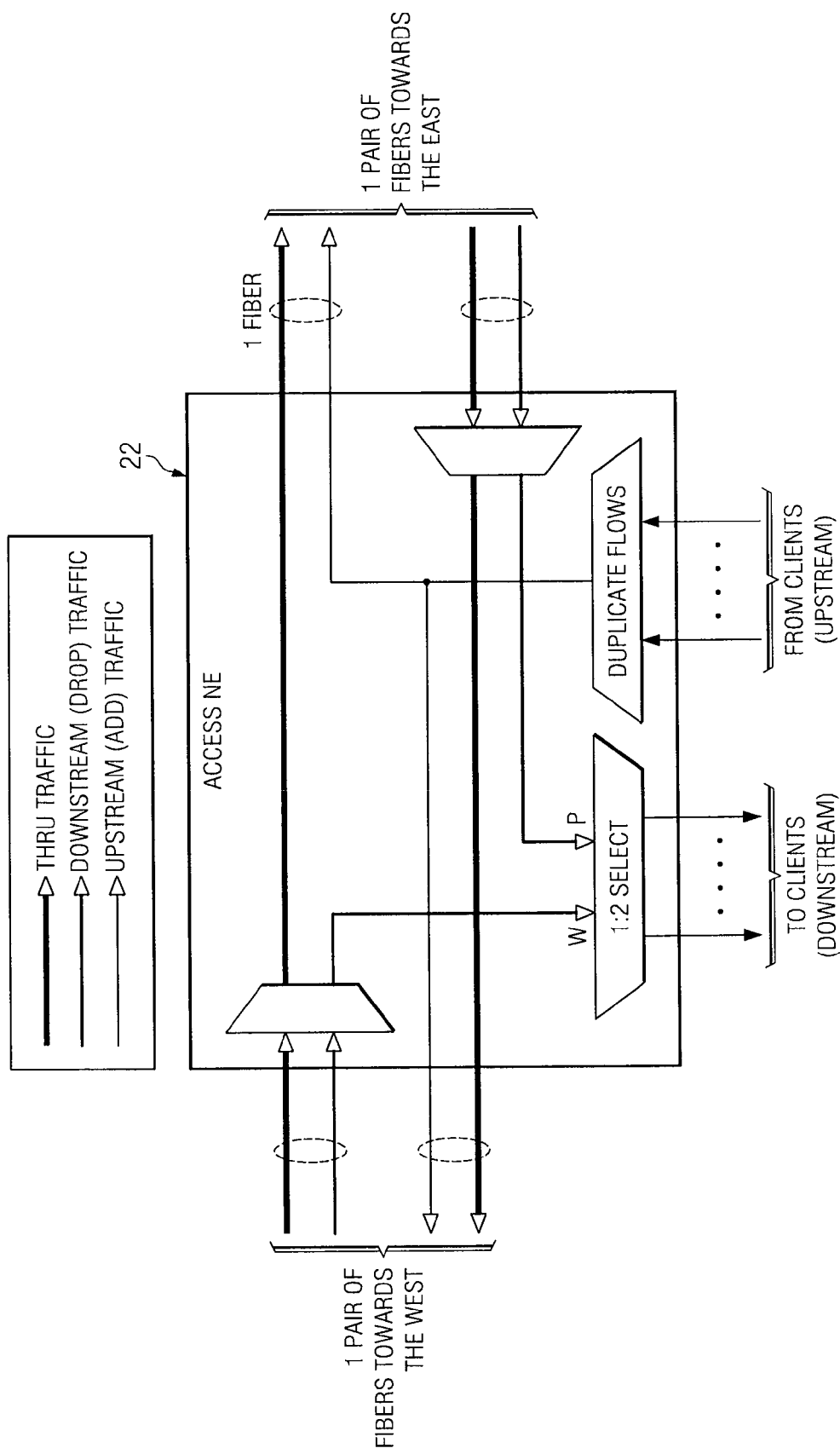
FIG. 7 illustrates an example of an access network element for 1+1 protection.

FIG. 7 illustrates an example of access network element 22 for 1+1 protection. In the example, thru traffic passes through transparently. Drop traffic is selected when both directions are active. Add traffic is duplicated and sent in both ring directions.

Figure 8A:
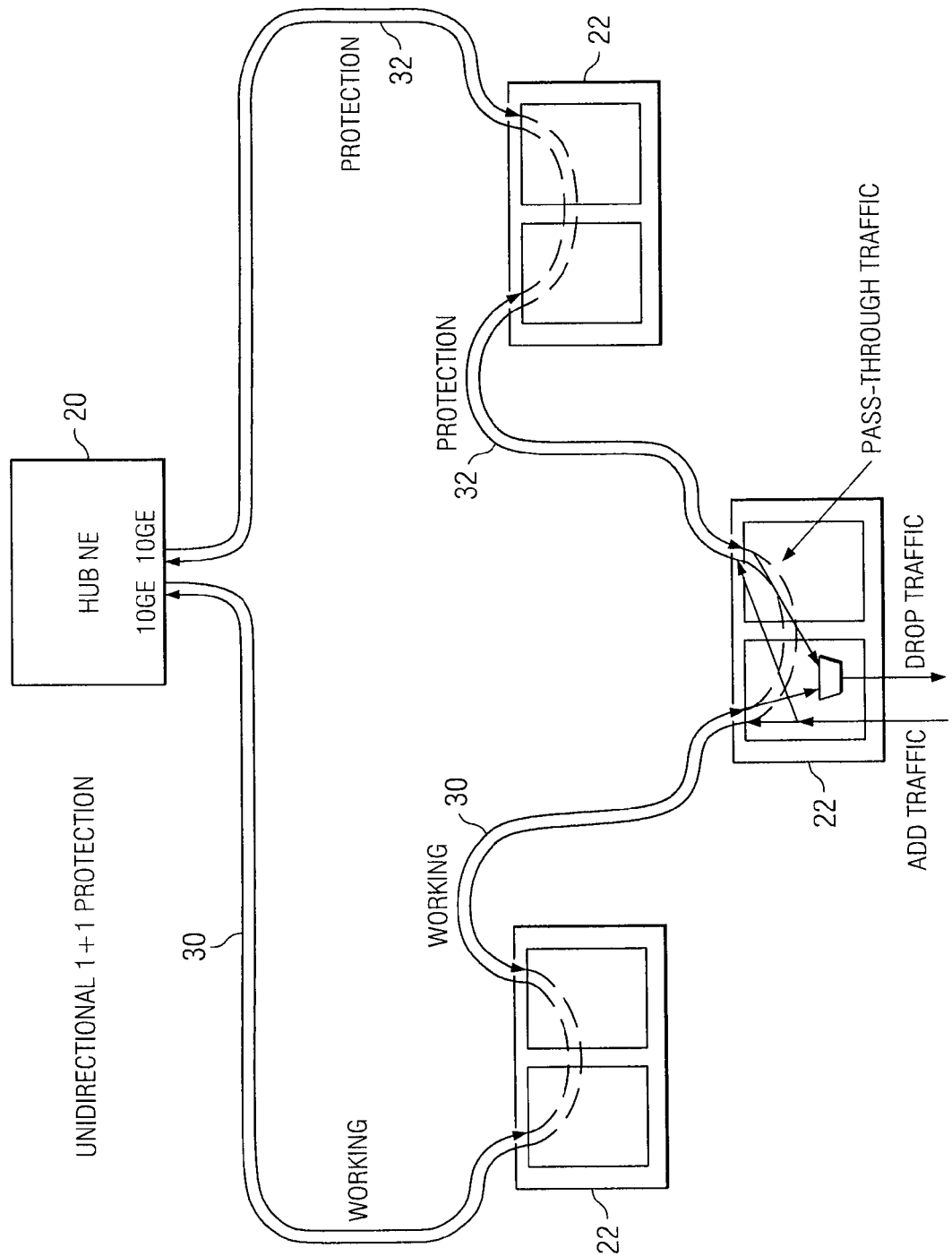
FIGS. 8A and 8B illustrate an example of 1+1 protection for a ring network.
Figure 8B:
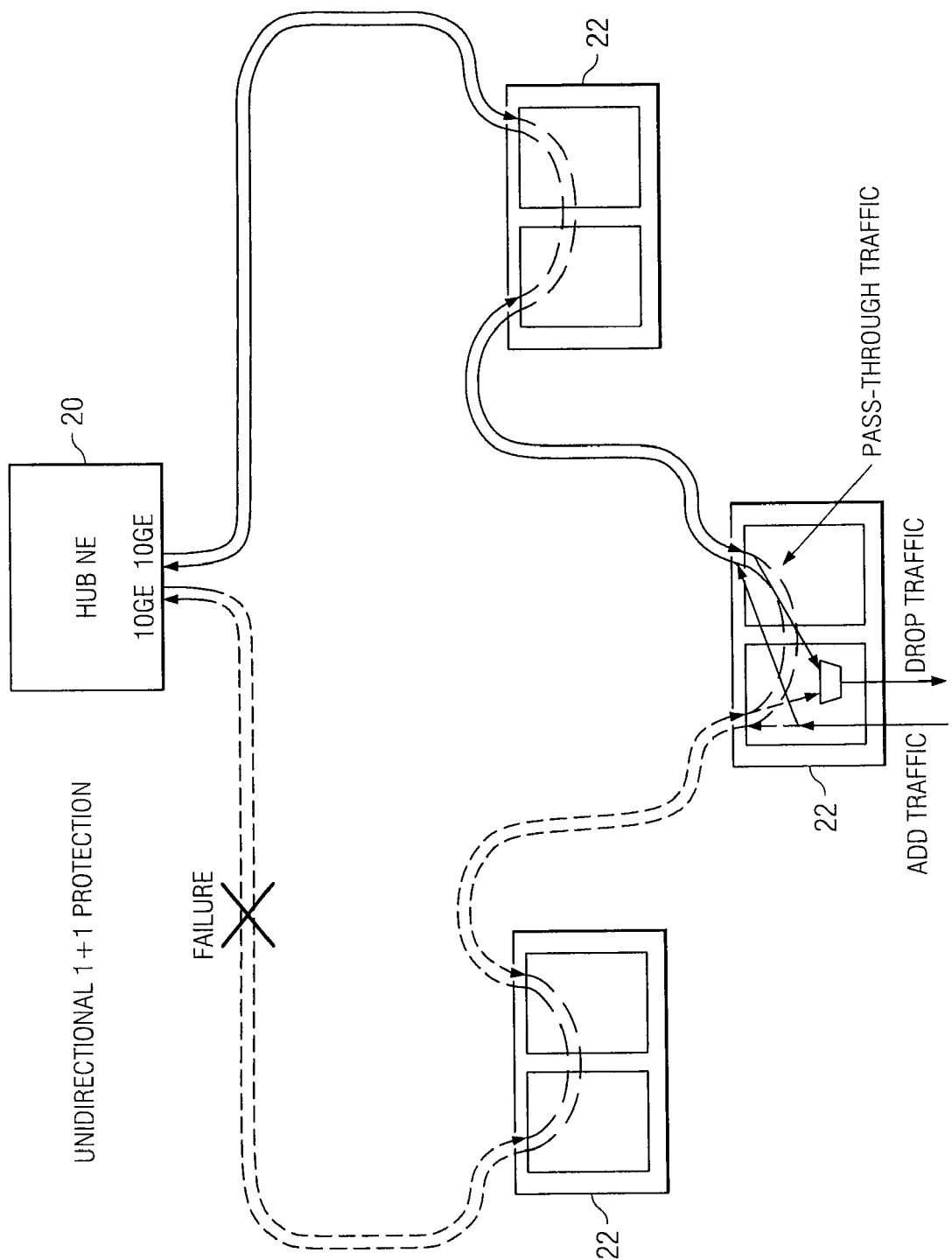

FIGS. 8A and 8B illustrate an example of 1+1 protection for ring network 10 with hub network element 20 and access network elements 22. Ring network 10 has working path 30 and protection path 32. If a failure occurs, access network elements 22 can still send and receive flows.

Figure 9A:
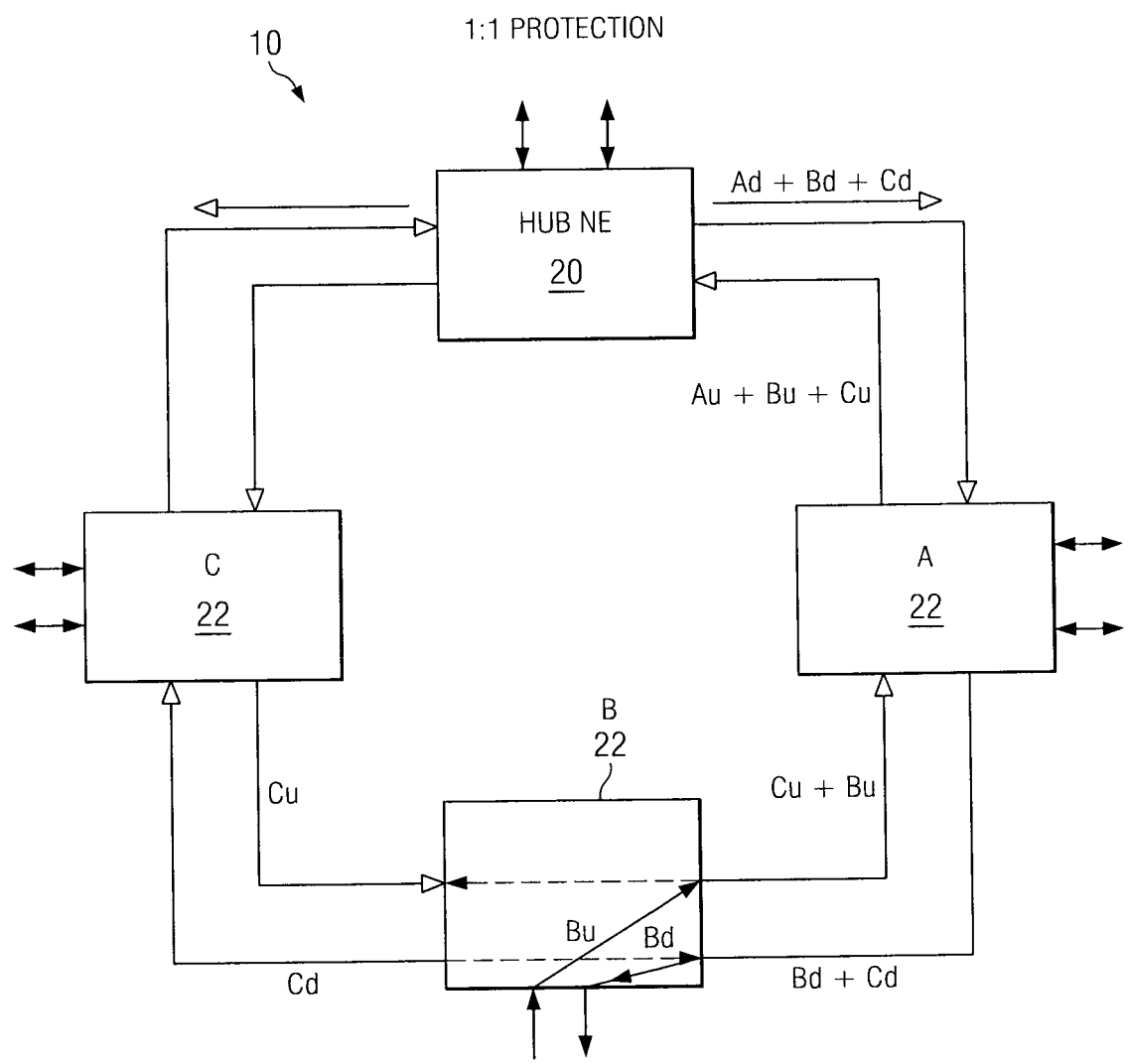
FIGS. 9A and 9B illustrate an example of 1:1 protection for a ring network.
Figure 9B:
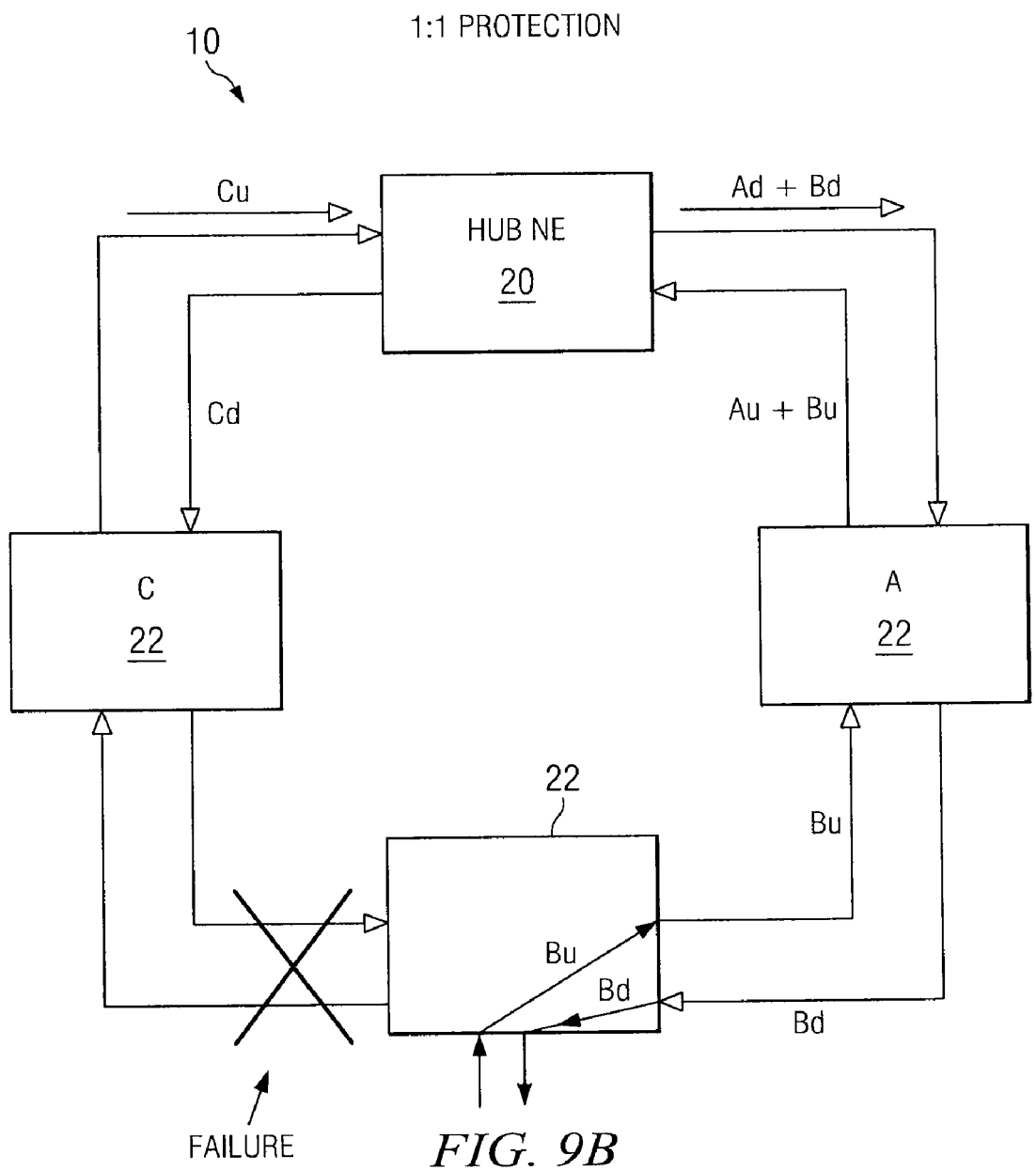

FIGS. 9A and 9B illustrate an example of 1:1 protection for ring network 10 with hub network element 20 and access network elements 22A, B, and C. Each flow is sent and received from a single hub port of hub network element 20. If a failure occurs, access network elements 22 can still send and receive flows.

Figure 10:
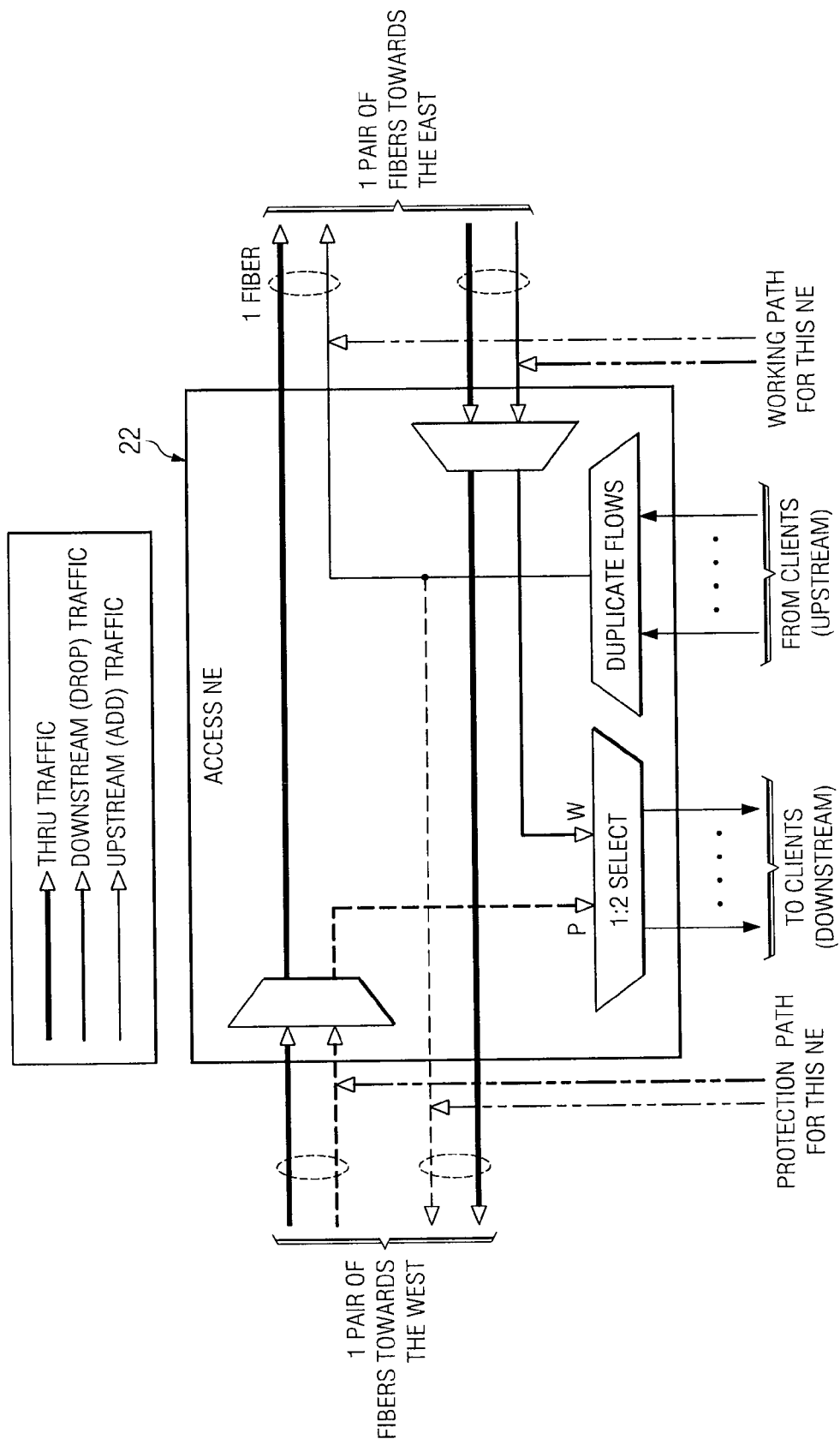
FIG. 10 illustrates an example of an access network element for 1:1 protection.

FIG. 10 illustrates an example of access network element 22 for 1:1 protection. In the example, thru traffic passes through transparently in both directions. Drop traffic is selected only from the working path and is sent on the working path.

Figure 11A:
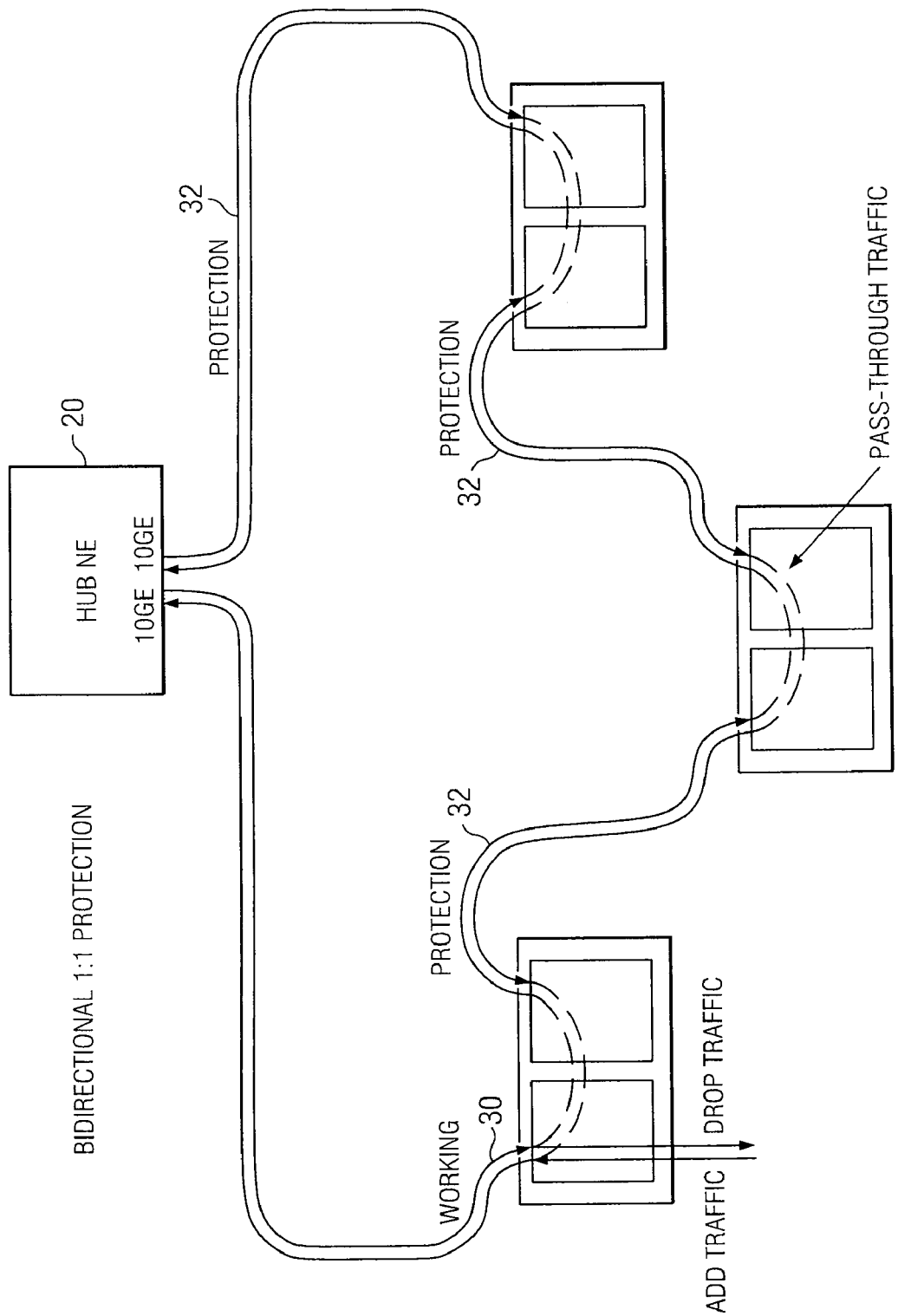
FIGS. 11A through 11D illustrate examples of 1:1 protection for a ring network.
Figure 11B:
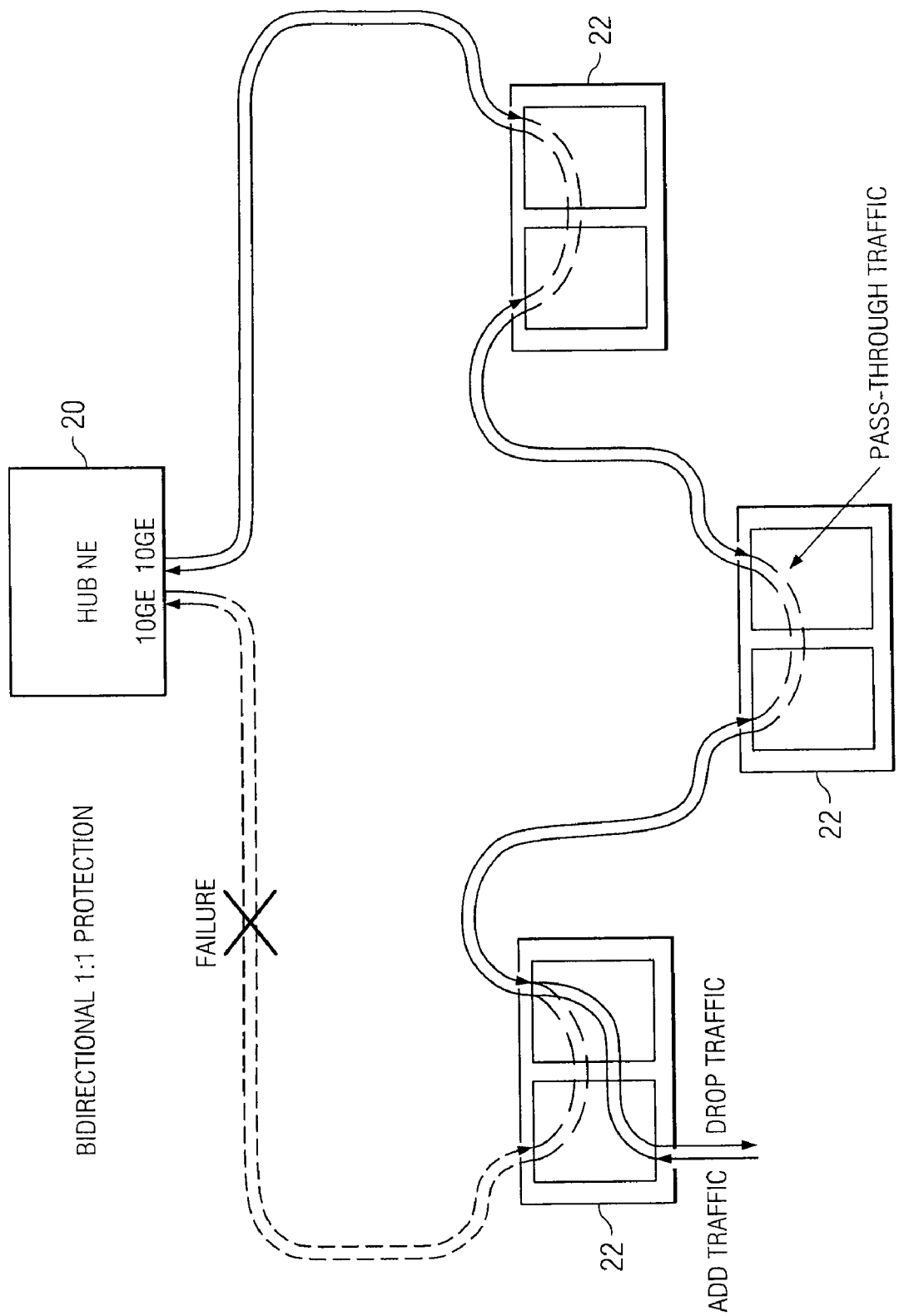
Figure 11C:
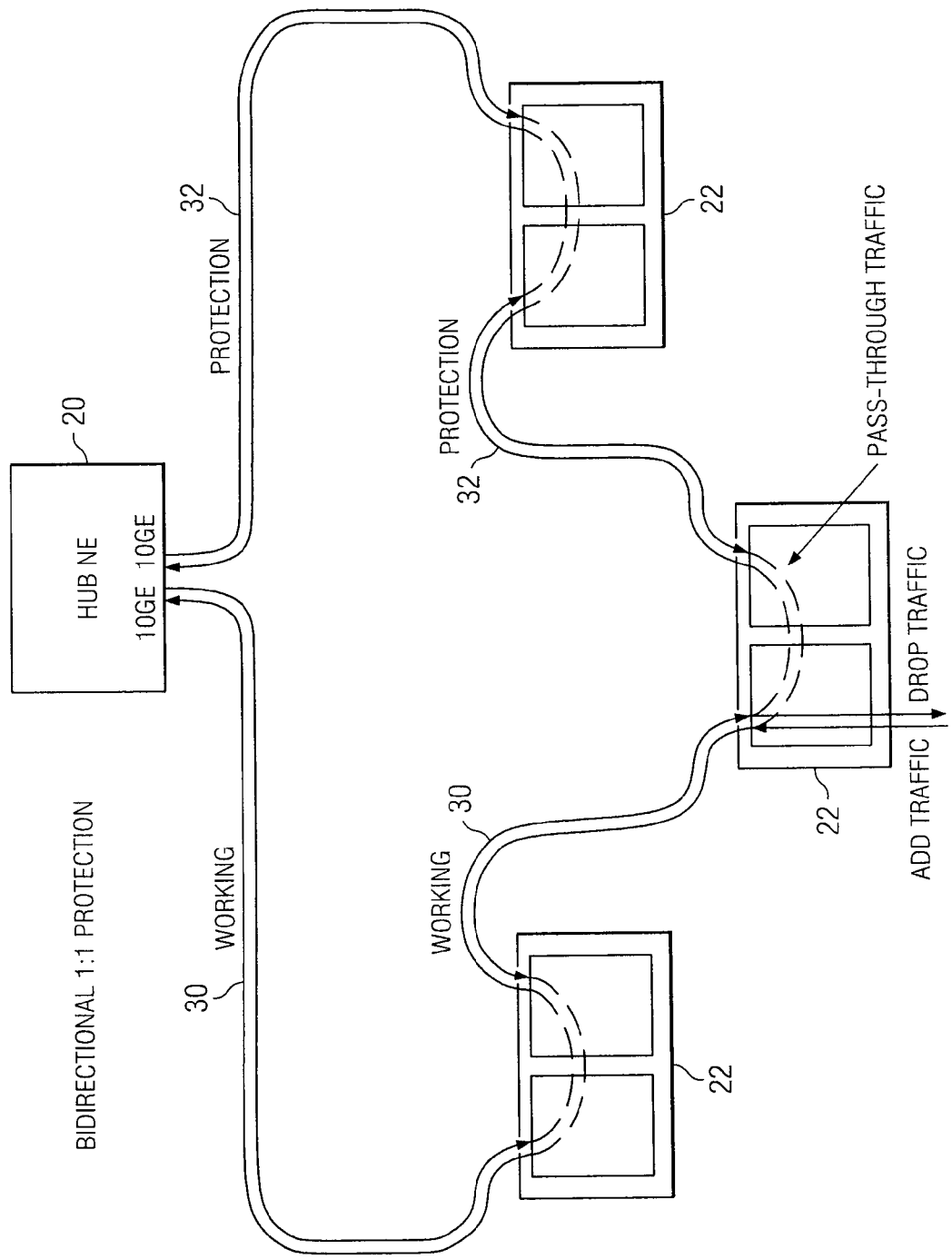
Figure 11D:
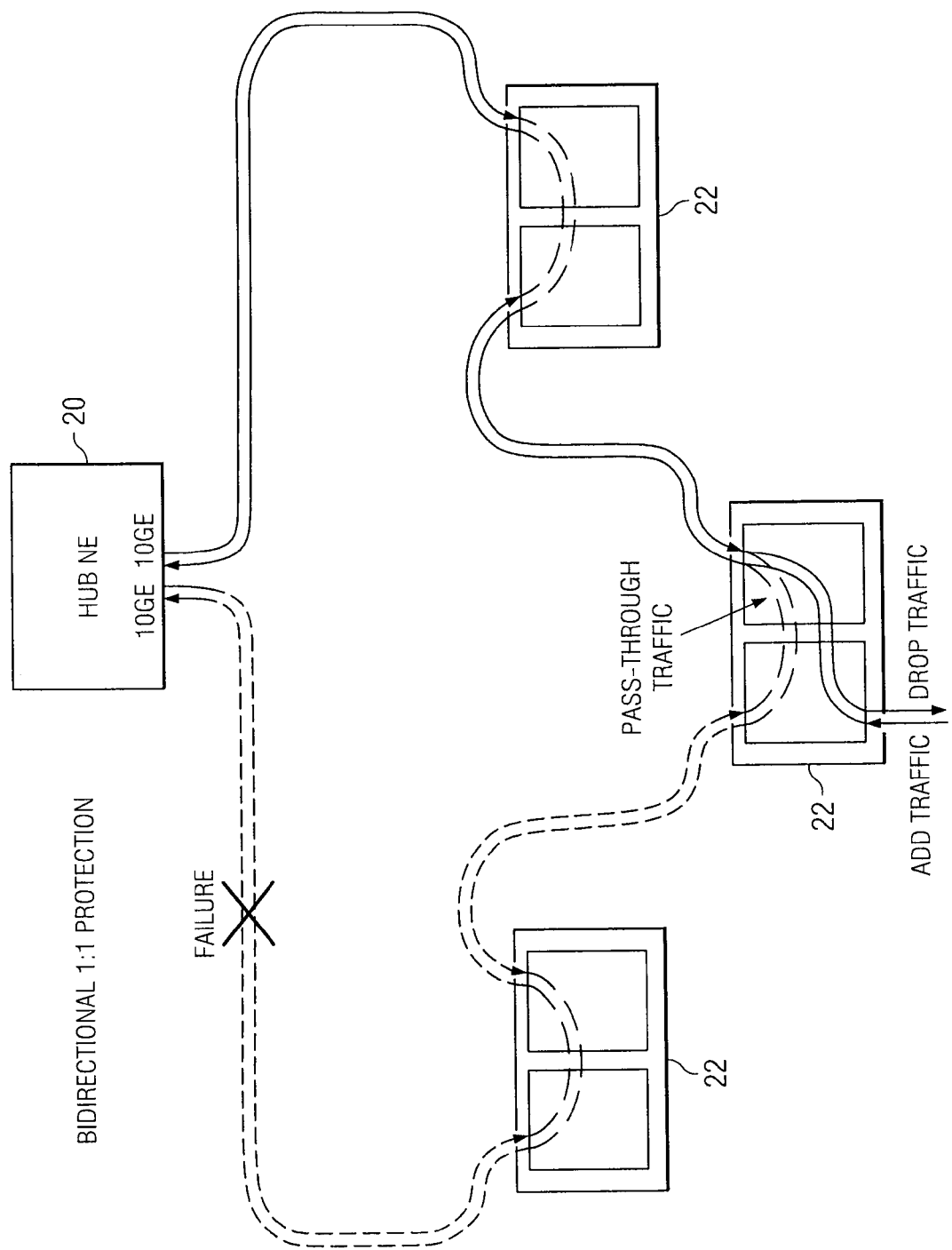

FIGS. 11A though 11D illustrate examples of 1:1 protection for ring network 10 with hub network element 20 and access network elements 22. FIGS. 11A and 11B illustrate one example of working path 30 and protection path 32. If a failure occurs, access network elements 22 can still send and receive flows. FIGS. 11C and 11D illustrate another example of working path 30 and protection path 32. If a failure occurs, access network elements 22 can still send and receive flows.

A component of any of the systems or networks disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as one or more processors, may perform the operations of a component, such as operations described herein. Examples of a processor include one or more computers, one or more microprocessors, one or more network processors, one or more application-specific integrated circuits (ASICs), and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems disclosed in this application without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods disclosed in this application without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   one or more hub interfaces of a hub network element coupled to a plurality of access network elements of a ring network, the ring network comprising a pair of rings comprising a first ring traveling in a first direction and a second ring traveling in a second direction opposite the first direction, the hub network element managing communications to and from the ring network; and
   one or more processors coupled to the one or more hub interfaces of the hub network element, the one or more processors operable to perform the following for each access network element:
      facilitate establishing a pair of point-to-point logical connections to couple each access network element to a hub interface at a corresponding dedicated bandwidth, a first connection traveling along the first ring, a second connection traveling along the second ring;
      facilitate establishing a pair of tunnels on the pair of point-to-point connections, the pair of tunnels comprising a first tunnel and a second tunnel, the hub network element shaping traffic for the first and second tunnels; and
      utilize the tunnels to protect the ring network.

2. The apparatus of claim 1, the processors operable to:
   establish a working path on the first tunnel; and
   establish a protection path on the second tunnel.

3. The apparatus of claim 1, the processors operable to utilize the tunnels to protect the ring network by:
   monitoring the tunnels using one or more service Operation, Administration, and Maintenance (s-OAM) flows.

4. The apparatus of claim 1, the one or more processors operable to shape downstream traffic toward the plurality of access network elements.

5. A method comprising:
   communicating, using one or more hub interfaces of a hub network element, with a plurality of access network elements of a ring network, the ring network comprising a pair of rings comprising a first ring traveling in a first direction and a second ring traveling in a second direction opposite the first direction, the hub network element managing communications to and from the ring network;
   performing, by one or more processors coupled to the one or more hub interfaces of the hub network element, the following for each access network element:
      facilitating establishing a pair of point-to-point logical connections to couple each access network element to a hub interface at a corresponding dedicated bandwidth, a first connection traveling along the first ring, a second connection traveling along the second ring;
      facilitating establishing a pair of tunnels on the pair of point-to-point connections, the pair of tunnels comprising a first tunnel and a second tunnel, the hub network element shaping traffic for the first and second tunnels; and
      utilizing the tunnels to protect the ring network.

6. The method of claim 5, further comprising:
   establishing a working path on the first tunnel; and
   establishing a protection path on the second tunnel.

7. The method of claim 5, the utilizing the tunnels to protect the ring network further comprising:
   monitoring the tunnels using one or more service Operation, Administration, and Maintenance (s-OAM) flows.

8. The method of claim 5, further comprising:
   shaping downstream traffic toward the plurality of access network elements.

9. An apparatus comprising:
   one or more interfaces coupled to a hub network element and at least a subset of a plurality of access network elements of a ring network, the ring network comprising a pair of rings comprising a first ring traveling in a first direction and a second ring traveling in a second direction opposite the first direction, the hub network element managing communications to and from the ring network; and
   one or more processors coupled to the one or more interfaces, the one or more processors operable to:
      facilitate establishing a pair of point-to-point logical connections between each access network element and the hub network element at a corresponding dedicated bandwidth, a first connection traveling along the first ring, a second connection traveling along the second ring;
      facilitate establishing a pair of tunnels on the pair of point-to-point connections, the tunnels comprising a first tunnel and a second tunnel, the hub network element shaping traffic for the first and second tunnels; and
      utilize the tunnels to protect the ring network.

10. The apparatus of claim 9, the one or more processors operable to:
    shape upstream traffic traveling towards the hub network element such that the traffic does not exceed the dedicated bandwidth.

11. The apparatus of claim 9, the one or more processors operable to:
    drop traffic received from the ring network; and
    add traffic to the ring network such that the added traffic does not exceed the dedicated bandwidth.

12. The apparatus of claim 9, comprising:
    a plurality of plug in units operable to manage traffic between a client and the hub network element, the plug in units comprising:
    a first plug in unit; and
    a second plug in unit operable to manage the traffic if the first plug in unit fails.

13. The apparatus of claim 9, the one or more processors operable to:
    protect the tunnels according to G.8031—Ethernet Linear Protection Switching of the International Telecommunication Union (ITU).

14. The apparatus of claim 9, each tunnel of a tunnel pair comprising a Virtual Local Area Network (VLAN) or Provider Backbone Bridge Traffic Engineering (PBB-TE) tunnel.

15. A method comprising:

communicating, using one or more interfaces, with a hub network element and at least a subset of a plurality of access network elements of a ring network, the ring network comprising a pair of rings comprising a first ring traveling in a first direction and a second ring traveling in a second direction opposite the first direction, the hub network element managing communications to and from the ring network; and performing, by one or more processors coupled to the one or more interfaces, the following:

facilitating establishing a pair of point-to-point logical connections between each access network element and the hub network element at a corresponding dedicated bandwidth, a first connection traveling along the first ring, a second connection traveling along the second ring;

facilitating establishing a pair of tunnels on the pair of point-to-point connections, the tunnels comprising a first tunnel and a second tunnel, the hub network element shaping traffic for the first and second tunnels; and utilizing the tunnels to protect the ring network.

16. The method of claim 15, further comprising:
shaping upstream traffic traveling towards the hub network element such that the traffic does not exceed the dedicated bandwidth.

17. The method of claim 15, further comprising:
dropping traffic received from the ring network; and
adding traffic to the ring network such that the added traffic does not exceed the dedicated bandwidth.

18. The method of claim 15, an access network element comprising:
a plurality of plug in units operable to manage traffic between a client and the hub network element, the plug in units comprising:
a first plug in unit; and
a second plug in unit operable to manage the traffic if the first plug in unit fails.

19. The method of claim 15, further comprising:
protecting the tunnels according to G.8031—Ethernet Linear Protection Switching of the International Telecommunication Union (ITU).

20. The method of claim 15, each tunnel of a tunnel pair comprising a Virtual Local Area Network (VLAN) or Provider Backbone Bridge Traffic Engineering (PBB-TE) tunnel.

* * * * *